United States Patent
Verleene

(10) Patent No.: US 9,987,881 B2
(45) Date of Patent: Jun. 5, 2018

(54) STEEL WIRE WITH HIGH DRAWABILITY HAVING A CARBON LEVEL BY MASS OF BETWEEN 0.05% INCLUSIVE AND 0.4% EXCLUSIVE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Arnaud Verleene, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 95 days.

(21) Appl. No.: 15/037,271

(22) PCT Filed: Nov. 21, 2014

(86) PCT No.: PCT/EP2014/075221
§ 371 (c)(1),
(2) Date: May 17, 2016

(87) PCT Pub. No.: WO2015/075161
PCT Pub. Date: May 28, 2015

(65) Prior Publication Data
US 2016/0280009 A1    Sep. 29, 2016

(30) Foreign Application Priority Data
Nov. 22, 2013    (FR) .................................. 13 61536

(51) Int. Cl.
*B60C 9/00*    (2006.01)
*C21D 9/52*    (2006.01)
(Continued)

(52) U.S. Cl.
CPC .............. *B60C 9/0007* (2013.01); *B60C 9/08* (2013.01); *B60C 9/2006* (2013.01); *C21D 9/52* (2013.01);
(Continued)

(58) Field of Classification Search
CPC ....... B60C 9/0007; B60C 9/08; B60C 9/2006; C21D 9/52
See application file for complete search history.

(56) References Cited

U.S. PATENT DOCUMENTS

| | | | | |
|---|---|---|---|---|
| 3,900,347 A | * | 8/1975 | Lorenzetti | ................ C21D 8/08 |
| | | | | 148/320 |
| 6,048,416 A | * | 4/2000 | Hauser | ................... C21D 8/065 |
| | | | | 148/500 |

(Continued)

FOREIGN PATENT DOCUMENTS

| EP | 0 953 651 | 11/1991 |
|---|---|---|
| EP | 0 976 541 | 2/2000 |

(Continued)

Primary Examiner — Jacob T Minskey
Assistant Examiner — Melody Tsui
(74) Attorney, Agent, or Firm — Cozen O'Connor

(57) ABSTRACT

The steel wire of diameter d expressed in mm has a completely ferritic, pearlitic or ferritic-pearlitic microstructure and a weight content of carbon C such that 0.05%≤C<0.4%, a weight content of chromium Cr such that Cr<12% and a maximum tensile strength R, expressed in MPa, such that R≥175+930.C−600.ln(d) and R≥1500 MPa.

14 Claims, 3 Drawing Sheets

(51) Int. Cl.

| | | |
|---|---|---|
| | C22C 38/02 | (2006.01) |
| | C22C 38/04 | (2006.01) |
| | C22C 38/18 | (2006.01) |
| | C22C 38/22 | (2006.01) |
| | C22C 38/24 | (2006.01) |
| | C22C 38/30 | (2006.01) |
| | C22C 38/32 | (2006.01) |
| | C22C 38/40 | (2006.01) |
| | D07B 1/06 | (2006.01) |
| | B60C 9/08 | (2006.01) |
| | B60C 9/20 | (2006.01) |
| | C22C 38/00 | (2006.01) |
| | B60C 9/04 | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/18* (2013.01); *C22C 38/22* (2013.01); *C22C 38/24* (2013.01); *C22C 38/30* (2013.01); *C22C 38/32* (2013.01); *C22C 38/40* (2013.01); *D07B 1/066* (2013.01); *B60C 2009/0085* (2013.01); *B60C 2009/045* (2013.01); *B60C 2009/0425* (2013.01); *B60C 2009/209* (2013.01); *B60C 2009/2077* (2013.01); *C21D 2211/005* (2013.01); *C21D 2211/009* (2013.01); *D07B 2201/2011* (2013.01); *D07B 2205/305* (2013.01); *D07B 2205/3042* (2013.01); *D07B 2205/3089* (2013.01)

(56) References Cited

U.S. PATENT DOCUMENTS

| | | |
|---|---|---|
| 2003/0212185 A1 | 11/2003 | Vasseur |
| 2004/0149362 A1* | 8/2004 | Kusinski ................ C21D 1/185 |
| | | 148/650 |

FOREIGN PATENT DOCUMENTS

| | | |
|---|---|---|
| JP | H 06-2039 | 1/1994 |
| WO | WO 97/26379 | 7/1997 |
| WO | WO 2005/113887 | 12/2005 |
| WO | WO 2008/113481 | 9/2008 |
| WO | WO 2009/109495 | 9/2009 |
| WO | WO 2010/139583 | 12/2010 |

* cited by examiner

STEEL WIRE WITH HIGH DRAWABILITY HAVING A CARBON LEVEL BY MASS OF BETWEEN 0.05% INCLUSIVE AND 0.4% EXCLUSIVE

RELATED APPLICATIONS

This is a U.S. National Phase Application under 35 USC 371 of International Application PCT/EP2014/075221 filed on Nov. 21, 2014.

This application claims the priority of French application no. 1361536 filed Nov. 22, 2013, the entire content of which is hereby incorporated by reference.

FIELD OF THE INVENTION

The invention relates to a steel wire, especially for a tire.

BACKGROUND OF THE INVENTION

A tire with carcass reinforcement, for example radial carcass reinforcement, comprises a tread, two inextensible beads, two sidewalls connecting the beads to the tread and a crown reinforcement, placed circumferentially between the carcass reinforcement and the tread.

The crown and/or carcass reinforcement comprises one or more rubber plies, optionally reinforced by reinforcing elements or reinforcers such as individual metal wires or metal cords originating from the assembly of several individual metal wires. The metal reinforcers are made of steel.

The crown reinforcement generally consists of at least two superposed crown plies, sometimes referred to as "working" plies or "crossed" plies, the generally metal, reinforcing cords of which are placed virtually parallel to one another within a ply but crossed from one ply to the other, that is to say inclined, symmetrically or asymmetrically, with respect to the median circumferential plane, by an angle which is generally between 10° and 45° depending on the type of tire in question. The cross plies may be supplemented by various other auxiliary rubber plies or layers, with widths that may vary as the case may be, and which may or may not contain reinforcers. Mention will be made, by way of example, of simple rubber cushions, plies referred to as "protective" plies responsible for protecting the rest of the crown reinforcement from external attacks or perforations, or else plies referred to as "hooping" plies comprising reinforcers oriented substantially in the circumferential direction (plies referred to as "zero-degree" plies), whether they are radially outer or inner with respect to the cross plies.

However, these metal reinforcers contribute significantly to the weight of the tire which it is desired to lighten as much as possible, by improving, if possible, their mechanical strength.

It is thus recommended to increase the weight content of elements of the steel, for example of carbon, to a level of 0.9%, or even more, which makes it possible to increase the mechanical strength of the wires, and therefore to reduce the diameter and/or the density thereof in the reinforcing plies, and thus to lighten the tire. A tire is obtained that is lightened but that has a relatively modest endurance. This is because the metal reinforcers are more sensitive to fatigue and to corrosion due to the use of a relatively high carbon content by weight.

SUMMARY OF THE INVENTION

One object of the invention is to provide a metal reinforcer that is less sensitive to fatigue and to corrosion.

For this purpose, one aspect of the invention is directed to a steel wire of diameter d expressed in mm, having a completely ferritic, pearlitic or ferritic-pearlitic microstructure and a weight content of carbon C such that $0.05\% \leq C < 0.4\%$, a weight content of chromium Cr such that $Cr < 12\%$ and a maximum tensile strength R, expressed in MPa, such that $R \geq 175 + 930.0 - 600.\ln(d)$ and $R \geq 1500$ MPa.

Firstly, the wire according to an embodiment of the invention has a relatively low weight content of carbon C. Thus, even though its maximum tensile strength may in certain cases be lower than that of wires of the prior art having a higher weight content of carbon C, the wire according to the invention is much less sensitive to fatigue and to corrosion, which improves the endurance of the tire and compensates for its initial deficit in maximum tensile strength.

Moreover, since the weight content of carbon is relatively low, the drawability of the wire, that is to say the possibility of sufficiently work hardening the wire by drawing in order to give it novel and inventive mechanical strength properties, especially a high maximum tensile strength, is improved.

Thus, it is possible to reduce the diameter of the wire, and therefore lighten the tire, while retaining a mechanical strength sufficient for reinforcing the tire.

Moreover, the industrial production cost of the wire according to an embodiment of the invention is relatively low, especially compared to that of a stainless steel wire. Furthermore, the use of a low content of chromium Cr makes it possible to obtain a wire having advantages in terms of constraints linked to the environment. Specifically, the use of chromium requires expensive specific measures to be employed, especially during the recycling of such wires, which may be avoided owing to the wire according to an embodiment of the invention.

The maximum tensile strength or ultimate tensile strength corresponds to the force necessary to break the wire. The measurements of maximum tensile strength, denoted by R (in MPa), are carried out according to the ISO 6892 standard of 1984.

The microstructure of the steel is completely ferritic, pearlitic or a mixture of these microstructures.

Thus, the microstructure of the steel is free of martensite and/or bainite. A ferritic-martensitic microstructure leads to cleavage between the ferritic and martensitic phases which is undesirable. A martensitic microstructure is not ductile enough to allow drawing of the wire, which would break too frequently.

A ferritic, pearlitic or ferritic-pearlitic microstructure is distinguished from another microstructure, in particular martensitic or bainitic microstructure, by metallographic observation. The ferritic-pearlitic microstructure has ferrite grains and lamellar pearlitic regions. On the contrary, the martensitic microstructure comprises laths and/or needles that those skilled in the art will know how to distinguish from the grains and lamellae of the ferritic-pearlitic and pearlitic microstructures.

More preferably, the microstructure of the steel is completely ferritic-pearlitic.

The wire is made of steel, that is to say that it consists predominantly (i.e. for more than 50% by weight) or completely (for 100% by weight) of steel as defined in the standard NF EN10020. In accordance with this standard, a steel is a material containing more iron than any other element, that has a carbon content of less than 2% and that contains other alloying elements. Still in accordance with this standard, the steel optionally comprises other alloying elements.

Preferably, the steel is an unalloyed steel as defined in the standard NF EN10020. Thus, the steel comprises, in addition to carbon and iron, other known alloying elements in amounts in accordance with the standard NF EN10020.

In another embodiment, the steel is an alloy steel as defined in the standard NF EN10020. In this embodiment, the steel comprises, in addition to the carbon and iron, other known alloying elements.

Preferably, the steel is not a stainless steel as defined in the standard NF EN10020. Thus, in this embodiment, the steel preferably comprises at most 10.5% by weight of chromium.

Advantageously, the wire has a weight content of carbon C such that $0.07\% \leq C \leq 0.3\%$, preferably $0.1\% \leq C \leq 0.3\%$, and more preferably $0.15\% \leq C \leq 0.25\%$.

Advantageously, $R \geq 350 + 930 \cdot C - 600 \cdot \ln(d)$, preferably $R \geq 500 + 930 \cdot C - 600 \cdot \ln(d)$, more preferably $R \geq 700 + 930 \cdot C - 600 \cdot \ln(d)$.

Such a wire then has an improved maximum tensile strength R.

Advantageously, d is greater than or equal to 0.10 mm and preferably greater than or equal to 0.12 mm.

When the diameter d is too small, the industrial production cost of the wire becomes too high and incompatible with mass production.

In certain embodiments, $d > 0.15$ mm and $R \geq 1800$ MPa and preferably $d > 0.15$ mm and $R \geq 1900$ MPa.

Advantageously, d is less than or equal to 0.40 mm, preferably less than or equal to 0.25 mm, more preferably less than or equal to 0.23 mm and more preferably still less than or equal to 0.20 mm.

When the diameter d is too large, the flexibility and endurance of the wire are too low for a use of the wire in certain plies of the tire, in particular the carcass reinforcement, for example for a vehicle of the heavy-duty vehicle type.

In certain embodiments, $d \leq 0.15$ mm and $R \geq 2000$ MPa and preferably $d \leq 0.15$ mm and $R \geq 2100$ MPa.

Optionally, the microstructure of the steel is selected from ferrite, pearlite and mixtures of these microstructures. A ferritic-pearlitic or pearlitic microstructure is distinguished from another microstructure, in particular a martensitic microstructure, by metallographic observation. The ferritic-pearlitic microstructure has ferrite grains and lamellar pearlitic regions. On the contrary, the martensitic microstructure comprises laths and/or needles that those skilled in the art will know how to distinguish from the grains and lamellae of the ferritic-pearlitic and pearlitic microstructures.

Another aspect of the invention is directed to a cord comprising several wires as defined above.

For example, the cords are of layered type or of stranded type.

It is recalled that there are two possible techniques for assembling wires or strands:

either by cabling: in which case the wires or strands undergo no twisting about their own axis, because of a synchronous rotation before and after the assembling point;

or by twisting: in which case the wires or strands undergo both a collective twist and an individual twist about their own axis, thereby generating an untwisting torque on each of the wires or strands.

Another aspect of the invention is directed to a semi-finished element, comprising a rubber matrix in which at least one wire as defined above is embedded.

The rubber matrix comprises at least one diene elastomer, a reinforcing filler, a vulcanization system and various additives.

The diene elastomer of the rubber matrix is generally understood to mean an elastomer resulting at least in part (i.e. a homopolymer or a copolymer) from diene monomers (monomers bearing two conjugated or non-conjugated carbon-carbon double bonds).

Diene elastomers, in a known way, can be classified into two categories: those said to be "essentially unsaturated" and those said to be "essentially saturated". Particularly preferably, the diene elastomer of the rubber matrix is selected from the group of (essentially unsaturated) diene elastomers consisting of polybutadienes (BR), synthetic polyisoprenes (IR), natural rubber (NR), butadiene copolymers, isoprene copolymers and mixtures of these elastomers. Such copolymers are more preferably chosen from the group consisting of butadiene/stirene copolymers (SBR), isoprene/butadiene copolymers (BIR), isoprene/stirene copolymers (SIR), isoprene/butadiene/stirene copolymers (SBIR) and mixtures of such copolymers.

The rubber matrix may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

As reinforcing filler, use is preferably made of carbon black or an inorganic filler. More particularly, all carbon blacks, especially the blacks of HAF, ISAF and SAF type, conventionally used in tires, are suitable as carbon blacks. As nonlimiting examples of such blacks, mention may be made of the N115, N134, N234, N330, N339, N347 and N375 blacks. However, the carbon black may of course be used as a blend with reinforcing fillers and in particular other inorganic fillers. Such inorganic fillers include silica, especially highly dispersible silicas, for example the Ultrasil 7000 and Ultrasil 7005 silicas from Degussa.

Finally, a person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

It is also possible to add to the reinforcing filler, depending on the targeted application, inert (non-reinforcing) fillers such as clay particles, bentonite, talc, chalk and kaolin, that can be used for example in sidewalls or treads of coloured tires.

The rubber matrix may also comprise all or some of the standard additives customarily used in the elastomer compositions intended for the manufacture of tires, such as for example plasticizers or extending oils, whether the latter are of aromatic or non-aromatic nature, pigments, protective agents, such as antiozone waxes, chemical antiozonants, antioxidants, antifatigue agents, reinforcing resins, methylene acceptors (for example phenolic novolac resin) or methylene donors (for example HMT or H3M) as described, for example, in application WO 02/10269 (or US 2003/0212185).

The rubber matrix also comprises a vulcanization system based either on sulphur or on sulphur donors and/or on peroxide and/or on bismaleimides, vulcanization accelerators and vulcanization activators.

The actual vulcanization system is preferably based on sulphur and on a primary vulcanization accelerator, in particular an accelerator of sulphenamide type, such as selected from the group consisting of 2-mercaptobenzothiazyl disulphide (MBTS), N-cyclohexyl-2-benzothiazyl sulphenamide (CBS), N,N-dicyclohexyl-2-benzothiazyl sulphenamide (DCBS), N-tert-butyl-2-benzothiazyl sulphenamide (TBBS), N-tert-butyl-2-benzothiazyl sulphenimide (TBSI) and mixtures of these compounds.

A further aspect of the invention is directed to a tire comprising at least one wire as defined above.

Preferably, the tire is intended for passenger vehicles, industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles. More preferably, the tire is intended for heavy vehicles, agricultural or civil engineering machinery, aircraft, and other transport or handling vehicles.

Preferably, the wire is intended to reinforce a tire crown and/or carcass reinforcement. More preferably, the wire is intended to reinforce a tire carcass reinforcement.

Preferably, the tire is for a vehicle of the heavy-duty vehicle type, comprising a carcass reinforcement comprising at least one wire as described above.

BRIEF DESCRIPTION OF THE DRAWINGS

The invention will be better understood on reading the following description, given solely by way of nonlimiting example and with reference to the drawings in which.

DETAILED DESCRIPTION OF THE DRAWINGS

Examples of Tires

Figure 1:
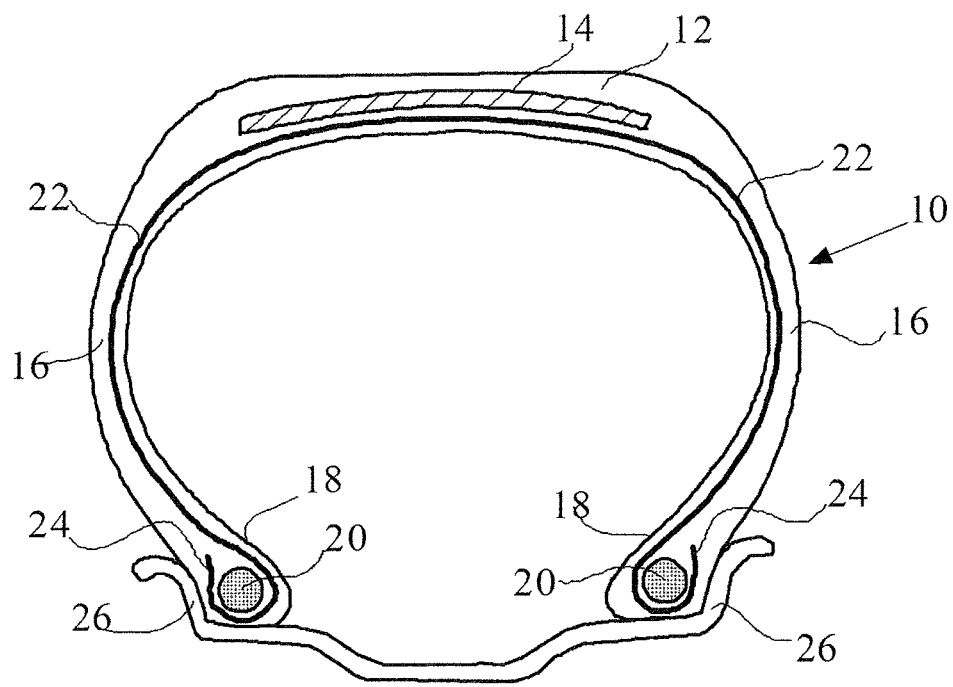
FIG. 1 is a cross-sectional view perpendicular to the circumferential direction of a tire according to an embodiment of the invention.

FIG. 1 depicts a tire according to the invention and that is denoted by the general reference 10.

The tire 10 has a crown 12 reinforced by a crown reinforcement 14, two sidewalls 16 and two beads 18, each of these beads 18 being reinforced with a bead wire 20. The crown 12 is surmounted by a tread, not shown in this schematic figure. A carcass reinforcement 22 is wound around the two bead wires 20 in each bead 18 and comprises a turn-up 24 positioned towards the outside of the tire 10, which is shown fitted onto a wheel rim 26 here.

The carcass reinforcement 22, in a manner known per se, consists of at least one ply reinforced by wires or cords in accordance with the invention. These wires or cords of the carcass reinforcement are referred to as "radial" wires or cords, that is to say that these wires or cords are positioned virtually parallel to one another and extend from one bead to the other so as to form an angle of between 80° and 90° with the median circumferential plane (plane perpendicular to the axis of rotation of the tire which is situated midway between the two beads 18 and passes through the middle of the crown reinforcement 14).

The crown reinforcement 14 comprises at least one ply reinforced by wires or cords in accordance with the invention. In this crown reinforcement 14 that is depicted in a very simple manner in FIG. 1, it will be understood that the wires or cords of the invention may for example reinforce all or some of the working crown plies or triangulation crown plies (or half plies) and/or protective crown plies, when such triangulation or protective crown plies are used. Besides the working plies, and the triangulation and/or protective plies, the crown reinforcement 14 of the tire of the invention may of course comprise other crown plies, for example one or more hooping crown plies.

Of course, the tire 10 additionally comprises, in a known manner, an inner rubber or elastomer layer (commonly referred to as "inner liner") which defines the radially inner face of the tire and which is intended to protect the carcass reinforcement from the diffusion of air originating from the space inside the tire. Advantageously, in particular in the case of a tire for a heavy-duty vehicle, it may also comprise an intermediate reinforcing elastomer layer which is located between the carcass reinforcement and the inner layer, intended to reinforce the inner layer and, consequently, the carcass reinforcement, and also intended to partially delocalize the stresses to which the carcass reinforcement is subjected.

The tire is manufactured by assembling the various elements described above present in the form of semi-finished elements comprising a rubber matrix in which the wires or cords in accordance with the invention are embedded.

Examples of Cords

In the case where the crown and/or carcass reinforcement is reinforced by cords, these are manufactured by assembling several steel wires in accordance with the invention, either by cabling or by twisting.

In the case of a tire for industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles, the crown and/or carcass reinforcement is reinforced by cords in accordance with the invention in particular selected from layered cords of 1+3+8, 1+6+11, 1+6+12, 2+7, 3+8, 3+9 and 3+9+15 structure and stranded cords of 3×(1+5), (1+6)×(3+8), (1+6)×(3+9+15) and (1+6)×(4+10+16) structure. Other cords that can reinforce the crown and/or carcass reinforcement are also described in document WO 2010/139583.

In the case of a tire for passenger vehicles, the crown and/or carcass reinforcement is reinforced by cords in accordance with the invention and in particular selected from the cords of 2+1, 2+2, 2+4 and 4×3 structure.

The cords in accordance with the invention may be rubberized in situ, as is described, inter alia, in document WO 2010/139583.

The crown and/or carcass reinforcement may also be reinforced by one or more individual wires in accordance with the invention but that are not assembled.

Examples of Wires

The wire is made of steel. Preferably, the steel is an unalloyed steel as defined in the standard NF EN10020.

Wires made of alloy steel as defined in the standard NF EN10020 can also be envisaged.

The steel used comprises a weight content of chromium Cr such that Cr<12%, preferably as defined in the standard NF EN10020, that is to say at most equal to 10.5%, more preferably Cr≤5% and more preferably still such that Cr≤1%, and ideally preferably such that Cr≤0.2%, and here Cr=0.039%.

The steel used may therefore preferably comprise known alloying elements such as for example Mn, Si, P, S, N, V, Cr, Mo, Ni, B and Co (see, for example, *Research Disclosure* 34984—"*Micro-alloyed steel cord constructions for tires*"—May 1993; *Research Disclosure* 34054—"*High tensile strength steel cord constructions for tires*"—August 1992) that make it possible to adapt the steel.

The preferred unalloyed steel in accordance with the standard NF EN10020 comprises at most 1.65% by weight and more preferably between 0.3 and 0.7% by weight of manganese, here 0.583%.

The preferred unalloyed steel in accordance with the standard NF EN10020 comprises at most 0.60% by weight and more preferably between 0.1 and 0.3% by weight of silicon, here 0.161%.

The preferred unalloyed steel in accordance with the standard NF EN10020 comprises at most 0.10% by weight and more preferably at most 0.045% by weight of phosphorus, here 0.0085%.

The preferred unalloyed steel in accordance with the standard NF EN10020 comprises at most 0.10% by weight and more preferably at most 0.045% by weight of sulphur, here 0.0151%.

The preferred unalloyed steel in accordance with the standard NF EN10020 comprises at most 0.10% by weight and more preferably at most 0.008% by weight of nitrogen, here 0.0029%.

The preferred unalloyed steel in accordance with the standard NF EN10020 comprises at most 0.10% by weight and more preferably at most 0.05% by weight and more preferably still 0.02% of vanadium, here 0%.

The values of the weight contents of the elements described above may be measured according to the standard FD CEN/TR 10261 entitled "Iron and steel—European standards for the determination of chemical composition".

Figure 3:
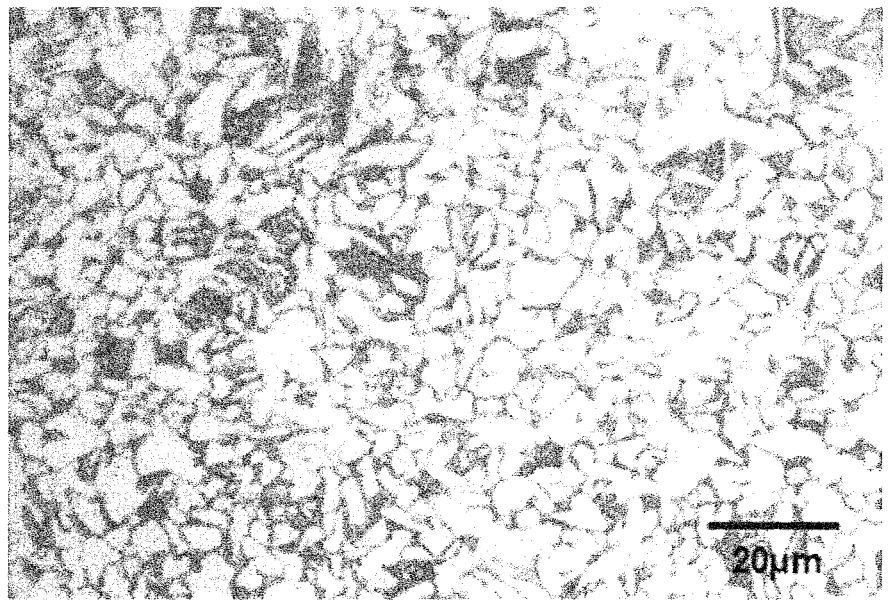
FIG. 3 is an optical microscope view of a ferritic-pearlitic microstructure.
Figure 4:
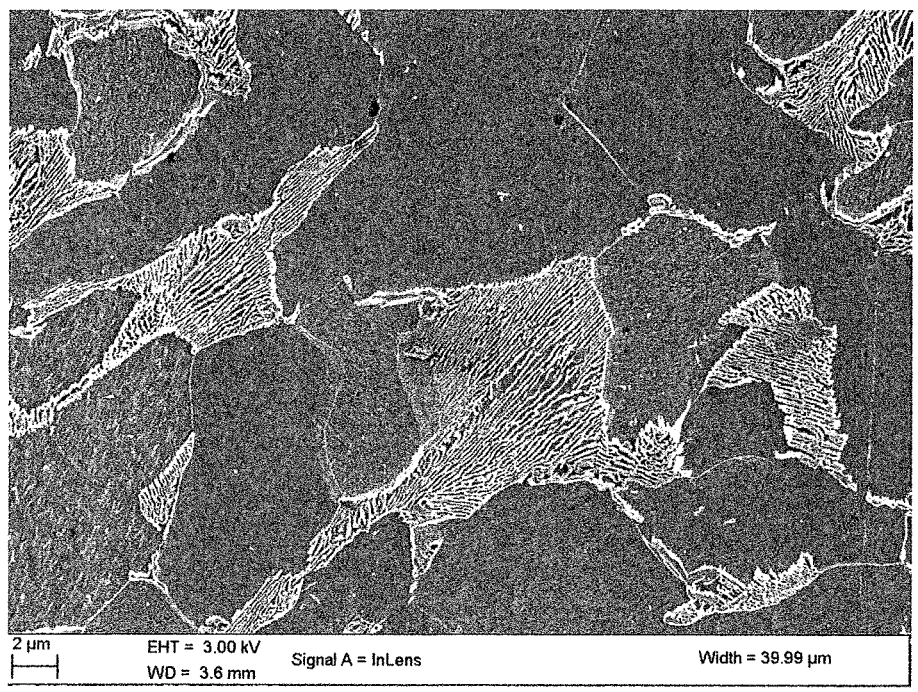
FIG. 4 is a scanning electron microscope view of a ferritic-pearlitic microstructure.

The microstructure of the steel is selected from ferrite, pearlite and mixtures of these microstructures. The wire is preferably made of ferritic-pearlitic steel, illustrated in FIGS. 3 and 4. The steel used comprises a content of carbon C, expressed in %, by weight of steel such that 0.05%≤C<0.4%, preferably 0.07%≤C≤0.3%, more preferably 0.1%≤C≤0.3% and more preferably still 0.15%≤C≤0.25%.

The wire may be coated with a metal layer that improves, for example, the processing properties of the wire, or the usage properties of the wire, of the cord and/or of the tire themselves, such as the adhesion, corrosion resistance or else ageing resistance properties. Preferably, the wire is coated with a layer of brass (Cu—Zn alloy) or of zinc. As a variant, the wire may have no metal coating.

Given in Table 1 below are wires EDT1, EDT2 according to the prior art and F1, F2, F3, F4 according to the invention.

The wires of the examples from Table 1 have a diameter d of greater than or equal to 0.10 mm and preferably greater than or equal to 0.12 mm. Moreover, the wires of the examples from Table 1 have a diameter d of less than or equal to 0.40 mm, preferably less than or equal to 0.25 mm, more preferably less than or equal to 0.23 mm and more preferably still less than or equal to 0.20 mm.

TABLE 1

|  | EDT 1 | EDT 2 | F1 | F2 | F3 | F4 |
|---|---|---|---|---|---|---|
| C(%) | 0.71 | 0.585 | 0.21 | 0.21 | 0.21 | 0.21 |
| d (mm) | 0.18 | 0.18 | 0.18 | 0.18 | 0.15 | 0.12 |
| R (MPa) | 2820 | 2903 | 1960 | 2088 | 2169 | 2307 |

The wires F1 to F4 according to the invention are such that the maximum tensile strength R of the wire, expressed in MPa, is such that R≥A+930.C−600.In(d) with A=175 and d expressed in mm.

It will be noted that the wires F1 to F4 are such that A=350, preferably A=500 and more preferably A=700.

It will be noted that the wires F1 to F4 according to the invention are such that R≥1500 MPa. The wires F1 and F2 are such that R≥1800 MPa and preferably R≥1900 MPa. The wires F3 and F4 are such that R≥2000 MPa and preferably R≥2100 MPa.

Examples of a Process for Drawing the Wire

Figure 2:
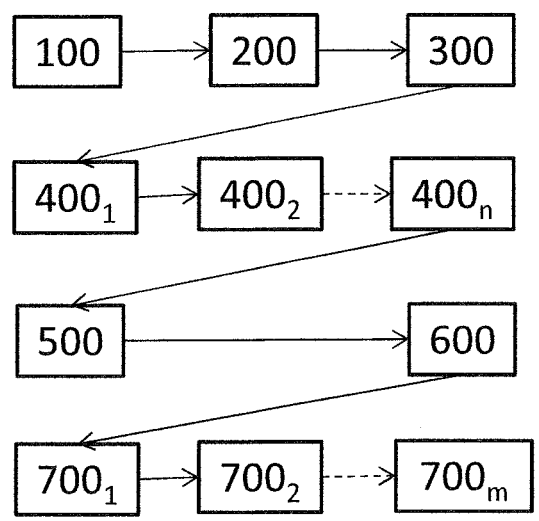
FIG. 2 is a diagram illustrating steps of a drawing process making it possible to obtain the wire according to an embodiment of the invention.

Represented in FIG. 2 is a diagram of a process that makes it possible to draw the wires according to the invention.

In an uncoiling step 100, a steel wire of initial diameter D≥4, preferably D≥5, here equal to 5.5 mm and having a maximum tensile strength of between 300 MPa and 700 MPa, in this case R=525 MPa, is uncoiled. The wire, referred to as wire stock, is stored in the form of a coil on a pay-off reel from which it is uncoiled using automated uncoiling means, for example an uncoiler. The steel microstructure is then ferritic-pearlitic.

In a step 200 of descaling the wire stock, the wire stock is passed into several successive pulleys and into two straighteners each formed by several pulleys, the pulleys of each straightener being rotatably mounted about an axis perpendicular to the axis of rotation of the pulleys of the other straightener. A layer of iron oxides, referred to as scale, present at the surface of the wire stock is thus removed.

In a step 300, the wire stock is coated with a layer of an adhesion promoter for a drawing lubricant.

The objective of steps $400_1$ to $400_n$ is to reduce the diameter of the wire from the initial diameter D to an intermediate diameter d', for example greater than or equal to 1 mm and preferably greater than or equal to 1.3 mm and for example less than or equal to 2.5 mm, preferably less than or equal to 2.2 mm and more preferably less than or equal to 2 mm.

Steps $400_1$ to $400_n$ (n varying from 6 to 12) form an uninterrupted series of steps of dry drawing the wire from the initial diameter D to the intermediate diameter d'. Each step $400_1$ to $400_n$ is a dry drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the uninterrupted series of steps of dry drawing the wire from the initial diameter D to the intermediate diameter d', the true strain is defined as ε=2.In(D/d').

Means for pulling the wire that are positioned downstream of each die, here capstans, make it possible to exert a pulling force sufficient to draw the wire through each die. A drawing lubricant in pulverulent form is used.

Dry drawing is understood to mean that the wire circulates in a gaseous environment, for example ambient air. Preferably, the drawing lubricant during dry drawing is in pulverulent form. During dry drawing, the pulling means, for example capstans, are exposed to the gaseous environment, for example ambient air.

An uninterrupted series of drawing steps is understood to mean that the wire makes a series of successive passes through several drawing dies, each pass through each drawing die corresponding to one drawing step. Apart from the last pass, each pass through a die is followed directly by a pass through the following die. In an uninterrupted series of drawing steps, the wire does not undergo any step, in particular heat treatment step or coating step, other than a drawing step between two drawing steps of the series. In other words, the wire does not undergo any step, in particular heat treatment step or coating step, between two directly successive drawing steps of the series.

In a heat treatment step 500, the metallographic structure of the wire of intermediate diameter d' is modified in order to regenerate the structure of the machine wire. Those skilled in the art know how to find the various parameters of this step, for example in "Les principes de base du traitement thermique des aciers" [The basic principles of heat treatment of steels], André Constant and Guy Henry, ISBN 2-85330-083-8.

Figure 5:
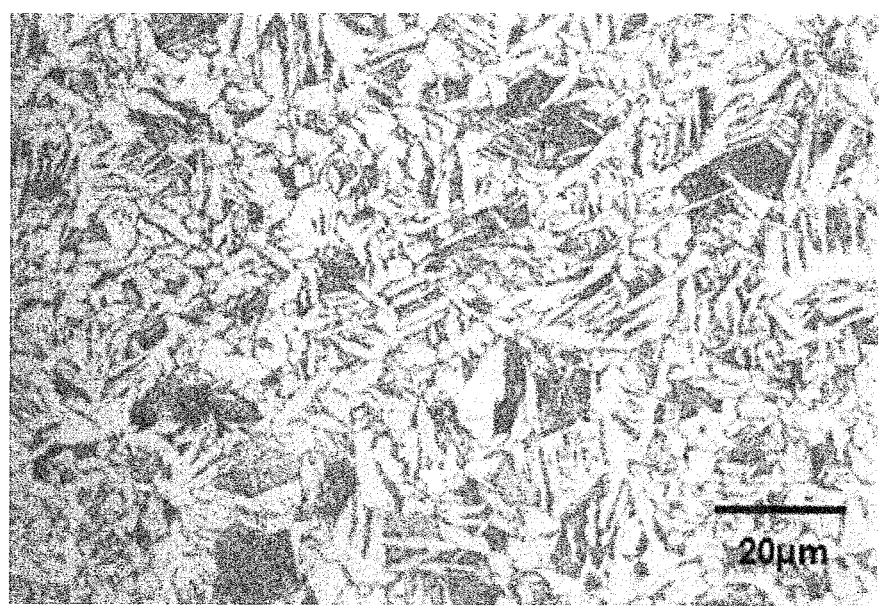
FIG. 5 is an optical microscope view of an acicular ferritic (Widmanstätten) microstructure.

During this step 500, the wire of intermediate diameter d' is is heated at a temperature greater than or or equal to the austenitizing temperature of the steel, here greater than or equal to 850° C. Depending on the chemical composition of the steel, those skilled in the art know, especially as described in "Précis de métallurgie" [Precis on metallurgy], ISBN 2-12-260121-6, what austenitizing temperature must be reached. Thus, if the austenitizing is not sufficient, non-recrystallized bands remain and the austenite obtained is not homogeneous which is detrimental to the subsequent drawing. If the austenitizing is too great, the microstructure obtained during subsequent cooling is an acicular (Widmanstätten) ferrite, illustrated in FIG. 5, and not a ferritic-pearlitic structure.

Next, the wire of intermediate diameter d' is cooled so as to give the steel a pearlitic or ferritic-pearlitic microstructure. In a manner well known to those skilled in the art, the wire is cooled in order to avoid the formation of a microstructure other than a pearlitic, ferritic or ferritic-pearlitic microstructure. Too fast a cooling rate would lead to a martensitic, bainitic or acicular ferritic microstructure. Those skilled in the art know how to determine the cooling rate as a function of the chemical composition of the steel and of the austenitizing temperature by means of nomograms available in particular in the document "Atlas des courbes de transformation des aciers de fabrication française" [Atlas of transformation curves of steels of French manufacture], IRDIS, 1974.

In step 600, the wire of intermediate diameter d' is coated with at least one metal layer, here a layer of brass.

The objective of steps $700_1$ to $700_m$ (m varying for example from 8 to 23) is to reduce the diameter of the wire from the intermediate diameter d' to the final diameter d and to increase the maximum tensile strength of the wire.

Steps $700_1$ to $700_m$ form an uninterrupted series of steps of wet drawing the wire from the intermediate diameter d' to the final diameter d. Each step $700_1$ to $700_m$ is a wet drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the uninterrupted series of steps of wet drawing the wire from the intermediate diameter d' to the final diameter d, the true strain is defined as $ε'=2.ln(d'/d)$.

As a variant, steps $700_1$ to $700_m$ will be carried out in a dry environment.

Means for pulling the wire that are positioned downstream of each die, here stepped capstans, make it possible to exert a pulling force sufficient to draw the wire through each die. The pulling means and the dies are immersed in a liquid bath of drawing lubricant, for example as described in document WO 2008/113481.

Wet drawing is understood to mean that the wire circulates in a liquid environment, for example an aqueous solution. Preferably, the drawing lubricant during wet drawing is in liquid form. During wet drawing, the pulling means, for example capstans, are exposed to the liquid environment, for example the aqueous solution.

An uninterrupted series of drawing steps is understood to mean that the wire makes a series of successive passes through several drawing dies, each pass through each drawing die corresponding to one drawing step. Apart from the last pass, each pass through a die is followed directly by a pass through the following die. In an uninterrupted series of drawing steps, the wire does not undergo any step, in particular heat treatment step or coating step, other than a drawing step between two drawing steps of the series. In other words, the wire does not undergo any step, in particular heat treatment step or coating step, between two directly successive drawing steps of the series.

The drawing process thus comprises N uninterrupted series of drawing steps, for example one in a dry environment and one in a wet environment. Here N=2. Thus, it is possible to define the total true strain for the drawing process as $εT=2.ln(D/d)$.

The drawing process comprises M heat treatment step(s) that aim to regenerate the structure of the machine wire. Here M=1 which makes it possible to reduce the industrial production cost of the wire of diameter d.

The wire according to the invention is capable of being obtained by the process described above.

Given in Table 2 are various values of the characteristics of the wires according to the invention and wires from the prior art.

TABLE 2

|  | EDT1 | EDT2 | F1 | F2 | F3 | F4 |
|---|---|---|---|---|---|---|
| C (%) | 0.71 | 0.585 | 0.21 | 0.21 | 0.21 | 0.21 |
| d' (mm) | 1 | 1.3 | 1.55 | 1.75 | 1.55 | 1.5 |
| d (mm) | 0.18 | 0.18 | 0.18 | 0.18 | 0.15 | 0.12 |
| ε | 2.6 | 2.8 | 2.5 | 2.3 | 2.5 | 2.6 |
| ε' | 3.6 | 4 | 4.3 | 4.5 | 4.7 | 5.1 |
| εT | 6.2 | 6.8 | 6.8 | 6.8 | 7.2 | 7.7 |

It will be noted that the true strain $ε'=2.ln(d'/d)$ is such that $4<ε'≤6$ for the wires F1 to F4. It will be noted that the true strain $ε=2.ln(D/d')$ is such that $2≤ε≤3$ for the wires F1 to F4. It will be noted that the true strain $εT=2.ln(D/d)$ is such that $6≤εT≤8$ for the wires F1 to F4.

It will be noted that, for the wires F1 to F4, $□≤3$, preferably $ε≤2.75$. It will be noted that, for the wires F1 to F3, more preferably $ε≤2.5$. It will also be noted that, for the wires F1 to F4, $εT≥6.5$ and preferably $εT≥6.75$. For the wire F3, more preferably $εT≥7.2$. For the wire F4, more preferably still $εT≥7.5$. In addition, it will be noted that, unlike the wires EDT1 and EDT2, $ε'>4$. For the wire F1, $ε'≥4.3$. For the wires F2 to F4, preferably $ε'≥4.5$. More preferably, for the wire F4, $ε'≥5$.

Comparative Tests and Trials

The wires from the prior art and the wires F1, F2 and F3 were compared during a rotating bending test carried out in a wet atmosphere (at least 60% relative humidity). This test makes it possible to measure the maximum rotating bending endurance stress in a wet environment $\sigma_F^*$ of each wire tested. During this test, the wire tested is subjected to $10^5$ cycles about its axis of revolution at a predetermined stress. If the wire breaks, the test is restarted with a lower stress and if the wire doesn't break, the test is restarted with a higher stress. The value of $\sigma_F^*$ is thus determined step-by-step, for example by the staircase method. The results of this test are given in Table 3 below:

TABLE 3

|  | EDT1 | EDT2 | F1 | F2 |
|---|---|---|---|---|
| C (%) | 0.71 | 0.585 | 0.21 | 0.21 |
| d (mm) | 0.18 | 0.18 | 0.18 | 0.18 |
| R (MPa) | 2820 | 2903 | 1960 | 2088 |
| $\sigma_F^*$ (MPa) | <500 | <500 | 685 | 725 |

The wires F1, F2 according to the invention break at significantly higher stresses than those of the prior art, and this in a wet environment, thus illustrating one of the advantages of the invention. Thus, even if the initial tensile strength of the wires F1, F2 is significantly lower than that of the wires EDT1 and EDT2, the fatigue-corrosion endurance of the wires F1, F2 is significantly greater than that of the wires EDT1 and EDT2.

Cords C1, C2 manufactured with the wires of the prior art EDT2 and cords CI1, CI2 manufactured with the wires F2 were also compared.

A first type of cord (C1 and CI1) having a (1+6+12)×0.18 structure was tested during a fluctuating tensile test. This test makes it possible to measure the endurance limit of each cord tested. During this test, each cord is subjected to a variation in tension between two extremums defining an amplitude, and this for a predetermined number of cycles, here $10^5$ cycles. If the cable breaks, the test is restarted with a lower amplitude and if the wire does not break, the test is restarted with a higher amplitude. The value of the endurance limit is thus determined step-by-step, for example by the staircase method. This test was carried out under two different conditions: under a dry atmosphere (less than 8% relative humidity) and under a wet atmosphere (more than 60% relative humidity). Under these conditions (dry and wet atmosphere without prior storage), the cord is tested directly. For these conditions, it was thus possible to determine the endurance limit T (dry atmosphere without prior storage) and T* (wet atmosphere without prior storage). The degradation D* of the endurance limit due to the presence of the wet atmosphere was also calculated (D*=(T−T*)/T). The results are given in Table 4 below.

TABLE 4

|  | C1 | CI1 |
|---|---|---|
| C (%) | 0.71 | 0.21 |
| Structure of the cord | 19.18 | 19.18 |
| Rm (MPa) | 2716 | 2032 |
| Fm (N) | 1283 | 956 |
| T (MPa) | 811 | 650 |
| T* (MPa) | 525 | 640 |
| D* | −35% | −1.5% |

The cord CI1 according to invention has a degradation that is significantly lower than the cord C1 of the prior art in a dry environment and in a wet environment thus illustrating one of the advantages of the invention. Thus, even though the tensile strength and the breaking force of the cord CI1 are lower than those of the cord C1, the fatigue-corrosion endurance of the cord CI1 is significantly greater than that of the cord C1.

A second type of cord (C2 from the prior art and CI2A and CI2B according to the invention) having a 3×0.18 mm structure was tested during a rotating bending test similar to that used for the above wire test. The maximum rotating bending endurance stresses in a dry environment $\sigma_C$ and a wet environment $\sigma_C^*$ of each cord tested were thus determined. The degradation $D\sigma_C^*$ of the maximum rotating bending endurance stress due to the presence of the wet atmosphere ($D\sigma_C^*=(\sigma_C-\sigma_C^*)/\sigma_C$) was also calculated. The results are given in Table 5 below.

TABLE 5

|  | C2 | CI2A | CI2B |
|---|---|---|---|
| C (%) | 0.71 | 0.21 | 0.21 |
| Structure of the cord | 3.18 | 3.18 | 3.18 |
| Rm of the cord (MPa) | 2750 | 1932 | 2066 |
| $\sigma_C$ (MPa) | 1250 | 825 | 935 |
| $\sigma_C^*$ (MPa) | 650 | 825 | 895 |
| $D\sigma_C^*$ | −48% | 0% | 4% |

The cords CI2A and CI2B according to the invention have a degradation that is significantly lower than the cord C2 of the prior art thus illustrating one of the advantages of the invention.

The invention is not limited to the embodiments described above.

Indeed, the descaling step 200 may be carried out by the action of a chemical agent, for example acid.

Furthermore, during the step 600, it is possible to coat the wire of intermediate diameter only with a layer of zinc. Moreover, the wire could be covered with a metal layer other than a brass or zinc layer, for example having the role of improving the corrosion resistance of the wire and/or the adhesion thereof to the rubber, for example a thin layer of Co, Ni, Al, or of an alloy of two or more of the compounds Cu, Zn, Al, Ni, Co, Sn.

The invention claimed is:

1. A steel wire of diameter d expressed in mm and having a completely ferritic, pearlitic or ferritic-pearlitic microstructure, wherein the wire has a weight content of carbon C such that 0.05%≤C<0.4%, a weight content of chromium Cr such that Cr<12% and a maximum tensile strength R, expressed in MPa and satisfying the following two conditions:
   i) R≥175+930*C−600*ln(d), and
   ii) R≥1500 MPa.
2. The wire according to claim 1, having a weight content of carbon C such that 0.07%≤C≤0.3%.
3. The wire according to claim 1, R≥350+930*C−600*ln (d).
4. The wire according to claim 1, wherein d is greater than or equal to 0.10 mm.
5. The wire according to claim 1, wherein d is less than or equal to 0.40 mm.
6. The wire according to claim 5, wherein d>0.15 mm and R≥1800 MPa.
7. The wire according to claim 1, wherein d≤0.15 mm and R≥2000 MPa.

8. A cord comprising several wires according to claim 1.

9. A semi-finished element comprising a rubber matrix in which at least one wire according to claim 1 is embedded.

10. A tire comprising at least one wire according to claim 1.

11. The wire according to claim 1, having a weight content of carbon C such that $0.15\% \leq C \leq 0.25\%$.

12. The wire according to claim 1, wherein $R \geq 700 + 930*C - 600*\ln(d)$.

13. The wire according to claim 1, wherein d is greater than or equal to 0.12 mm.

14. The wire according to claim 1, wherein $d \leq 0.15$ mm and $R \geq 2100$ MPa.

\* \* \* \* \*